United States Patent
van de Voort van de Kley

(10) Patent No.: US 9,787,158 B2
(45) Date of Patent: Oct. 10, 2017

(54) WORKING ASSEMBLY SUITABLE FOR USE IN AN AGRICULTURE MACHINE AND AN AGRICULTURE MACHINE

(71) Applicant: Kverneland A/S, Orstadvegen (NO)

(72) Inventor: Antonius Theodorus Maria van de Voort van de Kley, Hillegom (NL)

(73) Assignee: Kverneland A/S (NO)

( * ) Notice: Subject to any disclaimer, the term of this patent is extended or adjusted under 35 U.S.C. 154(b) by 36 days.

(21) Appl. No.: 14/894,080

(22) PCT Filed: May 27, 2014

(86) PCT No.: PCT/EP2014/060887
§ 371 (c)(1),
(2) Date: Nov. 25, 2015

(87) PCT Pub. No.: WO2014/191378
PCT Pub. Date: Dec. 4, 2014

(65) Prior Publication Data
US 2016/0105076 A1    Apr. 14, 2016

(30) Foreign Application Priority Data

May 29, 2013   (EP) ..................................... 13169715

(51) Int. Cl.
*H02K 21/04*   (2006.01)
*A01D 34/78*   (2006.01)
(Continued)

(52) U.S. Cl.
CPC .............. *H02K 7/14* (2013.01); *A01D 34/78* (2013.01); *H02K 21/24* (2013.01); *A01D 2101/00* (2013.01); *H02K 2213/12* (2013.01)

(58) Field of Classification Search
CPC .... A01D 34/78; A01D 34/90; F04D 25/0646; F04D 25/0633; H02K 23/54; H02K 3/522;
(Continued)

(56) References Cited

U.S. PATENT DOCUMENTS 4,605,873 A *  8/1986  Hahn .................... H02K 23/54
                                                          310/154.06
8,952,588 B2 *  2/2015  Tanimoto ............... A01D 34/78
                                                          310/208
(Continued)

FOREIGN PATENT DOCUMENTS

DE        2 223 520 A1     11/1973
DE        43 42 583 A1      6/1995
(Continued)

OTHER PUBLICATIONS

International Search Report pertaining to Application No. PCT/EP2014/060887.

*Primary Examiner* — Robert Pezzuto
(74) *Attorney, Agent, or Firm* — Dinsmore & Shohl LLP

(57) ABSTRACT

A working assembly (1) suitable for use in an agriculture machine, comprising a driving system (2) with a dynamic member (4) and a static member (6) and a working tool (3) received on the dynamic member (4), wherein essentially flat surfaces of the static and the dynamic member (4, 6) are provided opposite to each other. Further, the application contains an agriculture machine, namely one of spreader, seeder, and mower, comprising the working assembly (1).

14 Claims, 2 Drawing Sheets

(51) Int. Cl.
*H02K 7/14* (2006.01)
*H02K 21/24* (2006.01)
*A01D 101/00* (2006.01)

(58) Field of Classification Search
CPC ............ H02K 3/26; H02K 7/145; H02K 9/06;
H02K 7/04; H02K 5/18; H02K 1/2793;
H02K 11/0073; H02K 7/14; H02K 21/24;
H02K 2213/12
USPC ..... 56/1, 10.2 R, 12.7, 16.7; 310/71, 154.06,
310/208, 268; 417/423.7
See application file for complete search history.

(56) References Cited

U.S. PATENT DOCUMENTS

| | | | |
|---|---|---|---|
| 9,160,211 B2 * | 10/2015 | Tanimoto | ................ A01D 34/78 |
| 2003/0197080 A1 | 10/2003 | Karkos, Jr. et al. | |
| 2010/0129242 A1 * | 5/2010 | Yamada | ................ H02K 3/522 |
| | | | 417/423.7 |

FOREIGN PATENT DOCUMENTS

| | | |
|---|---|---|
| EP | 1 236 388 A1 | 2/2002 |
| EP | 2 061 136 A1 | 11/2007 |
| EP | 2 481 701 A1 | 8/2012 |
| WO | 2011/039978 A2 | 4/2011 |

* cited by examiner

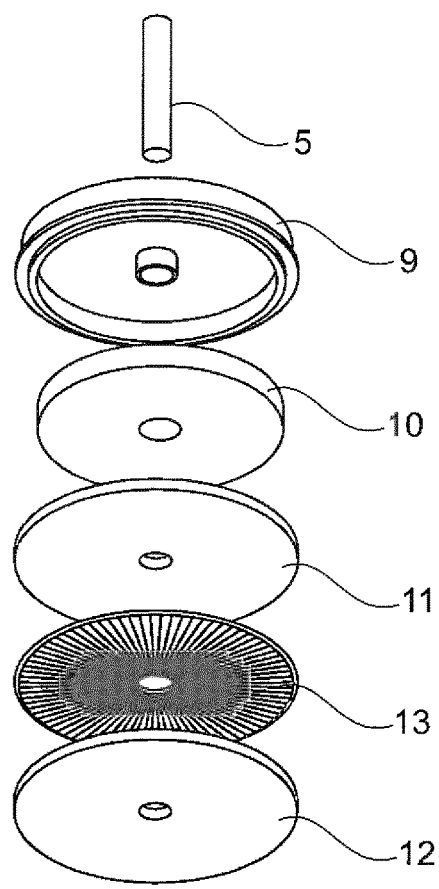
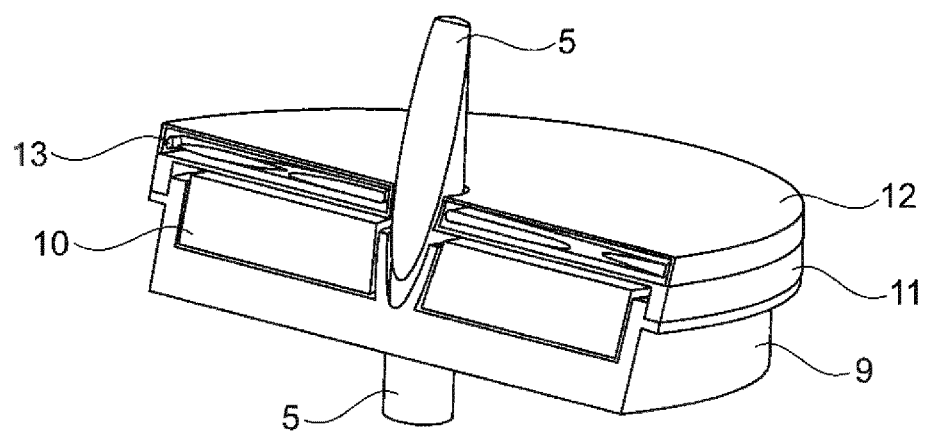

WORKING ASSEMBLY SUITABLE FOR USE IN AN AGRICULTURE MACHINE AND AN AGRICULTURE MACHINE

The present disclosure relates to a working assembly suitable for use in an agriculture machine and an agriculture machine.

BACKGROUND

There are different agriculture machines for which working tools have to be rotated in operation. For example, it is referred to mowers, spreaders, and seeders. In Document EP 1 236 388 A1 a disk shaped spreader device is disclosed. A driving force for rotating the working tool is provided by a motor.

Document DE 2 223 520 A1 discloses a magnet rotor device for agriculture machine, the device being provided with an electronic rotation controlling.

Document WO 2011/039978 A2 discloses an electric grasscutter which includes a motor which drives a rotary blade. The motor is a brushless motor accommodated in a motor housing and including a rotor provided integrally with an output shaft, and a stator fixed to the motor housing. A motor control circuit which drives the motor is accommodated in the motor housing. The motor control circuit includes an inverter having FETs as switching elements, and a control section to control the FETs. The FETs are fixed in contact with the motor housing.

SUMMARY

It is an object of the present disclosure to provide improved technologies for a working assembly suitable for use in an agriculture machine.

According to the present disclosure, a working assembly suitable for use in an agriculture machine according to claim 1 is provided. Further, an agriculture machine according to claim 12 is provided. Advantageous embodiments are provided in dependent claims.

According to an aspect, a working assembly suitable for use in an agriculture machine is provided. The working assembly comprises a driving system providing a driving force for rotating a working tool. The working tool may be an agriculture working tool used in an agriculture machine. The driving system is provided with a rotatable dynamic member, and a static member provided opposite to the dynamic member. There is a combination of driving elements provided with a coil assembly and a permanent magnet assembly. The coil assembly is provided on one of the dynamic member and the static member and is suitable for providing an electromagnetic driving field which, in conjunction with the permanent magnet assembly, provides a driving force for rotating the dynamic member. Depending on the location of the coil assembly either on the dynamic member or the static member, the permanent magnet is provided on the other driving element, namely the static member or the dynamic member. The coil assembly is suitable for providing an electromagnetic driving field which, in conjunction with the permanent magnet assembly, provides a driving force for rotating the dynamic member. By rotating the dynamic member the working tool received on the dynamic member is rotated. An essentially flat surface of the static member and an essentially flat surface of the dynamic member are provided opposite each other, thereby, providing flat surfaces facing each other and being separated by a distance.

According to another aspect, an agriculture machine, namely one of spreader, seeder, and mower is provided, the agriculture machine comprising the working assembly.

Parameters of the driving force may easily be adjusted by controlling a current supplied to the coil assembly. The working assembly can be implemented space-saving.

The working assembly may be customized for different applications in agriculture machines by, for example, providing a customized permanent magnet assembly.

The agriculture working tool may be provided directly on the dynamic member. There may be direct contact between the agriculture working tool and a mounting surface provided on the dynamic member.

The static member and the dynamic member are operated in a contact free operation mode.

The static member and the dynamic member may be provided with a common symmetry axis. Both members may be provided with essentially the same extension transverse to the common symmetry axis.

On the dynamic member, the working tool may be mounted on a surface opposite to the flat surface facing the flat surface of the static member. The dynamic member may not be encircled by the static member at all. The dynamic member may be provided by the working tool, for example, be providing a one-piece member comprising both the dynamic member and the working tool.

Though a design in which the dynamic member is carrying the permanent magnet assembly and the static member is provided with the coil assembly is a preferred embodiment, an alternative configuration may also be provided. In the alternative configuration the static member is provided with the permanent magnet assembly and the dynamic member is provided with the coil assembly. In operation, power may be provided to the coil assembly on the rotating dynamic member, for example, by inductive coupling.

At least one of the static member and the dynamic member may be provided as a disk shaped member. There may be two disk shaped members located opposite each other. The disk shaped member may be provided as a metal plate. At least one of the dynamic member and the static member may be provided with a disk shaped housing. The disk shaped housing may be a one-piece or a multi-piece housing. The disk shaped housing of the dynamic member may receive the permanent magnet assembly. The disk shaped housing of the static member may receive the coil assembly.

The driving system may be provided as a disk shaped system. For the disk shaped system the overall housing construction may be disk shaped.

The working tool may be releasable connected to the dynamic member. The agriculture working tool may be directly connected to the dynamic member, for example, by connecting mechanism provided on a mounting surface of the dynamic member.

The dynamic member may be releasable provided on the working assembly. In an embodiment, the dynamic member may be releasable connected to the carrier member.

The static member may be received on the carrier member. There may be a central axis provided by the carrier member along which the static member and/or the dynamic member are located. The central axis may provide a rotation axis for the dynamic member.

A controller device connected to the coil assembly. The controller device may be received on the static member or the dynamic member, preferably together with the coil assembly. The controller device may be provided on a printed circuit board received on the static member. The controller device may be configured to control a power supply providing power to the coil assembly. By controlling the power supply to the coil assembly a speed control for the rotation of the dynamic member carrying the working toll may be implemented. The controller device may collect data indicative of a coil current and/or signals to measure the behavior of the dynamic member to optimize the working tool.

The dynamic member is provided as freely floating member, e.g. a freely floating disk. In this embodiment the dynamic member is frictionless (contactless) received in the working assembly. There may be no contact at all between the dynamic member and the carrier member. The dynamic member may be hold in position by electromagnetic contactless forces only. As an alternative, the dynamic member may be received or mounted on the carrier member. The dynamic member may be rotatable around the carrier member.

The working tool may be suitable for use in at least one of the following agriculture machines: spreader, seeder, and mower. The disk shaped dynamic member may be provided as a mower disk, seeder disk or a spreader disk.

At least one of the dynamic member and the static member may be equipped with an electronic controlling unit configured for optimizing working tool operation. For example, a spreader tool or a mower tool assembly may be equipped with a strain gage for measuring one or more work tool forces. Data related to such work tool force(s) may be input data for kg/time in case of the spreader and some working condition of the mowing device, respectively. The data detected may be indicative of losing a mower knife and/or of an unbalance condition.

BRIEF DESCRIPTION OF THE DRAWINGS

Following further embodiments will be described, by way of example, with reference to figures. In the figures show.

DETAILED DESCRIPTION

Figure 1:
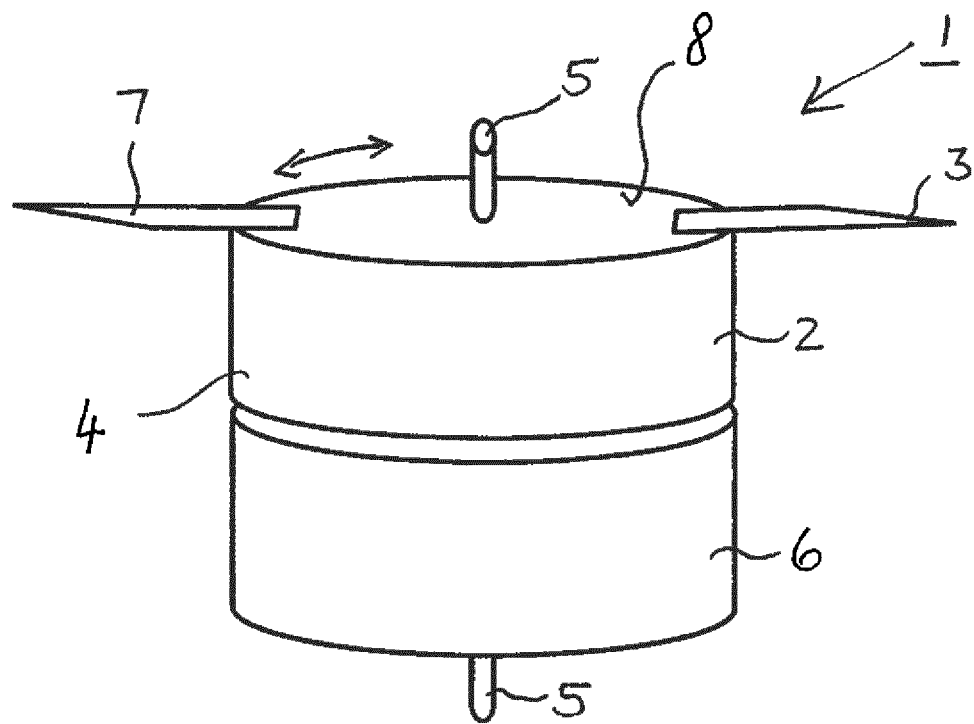
FIG. 1 a schematic representation of a working assembly suitable for use in an agriculture machine in a perspective view, FIG. 2 a schematic exploded representation of the working assembly in FIG. 1 depicting further details, FIG. 3 a schematic representation of the working assembly in FIG. 2 assembled, and FIG. 4 a schematic representation of a working assembly provided a mower disk carrying a blade in a front view.

FIG. 1 shows a schematic representation of a working assembly 1 suitable for use in an agriculture machine in a perspective view. The working assembly 1 is provided with a driving system 2 and a working tool 3. The driving system 2 comprises a dynamic member 4 rotatable received on a carrier member 5. In addition, there is a static member 6, in the embodiment shown, also received on the carrier member 5. The carrier member 5 provides a symmetry axis for both, the dynamic member 4 and the static member 6.

The working tool 3 provided with a blade 7 is mounted on a mounting surface 8 of the dynamic member 4, thereby, providing a mower plate for use in a mower.

FIG. 2 shows a schematic exploded representation of the working assembly 1 in FIG. 1 depicting further details of the working assembly 1. The dynamic member 4 is provided with a dynamic member housing 9 receiving a permanent magnet 10. The static member 6 is provided with an upper static member housing part 11 and a lower static member housing part 12, both covering a coil assembly 13. In operation the coil assembly 13 is provided with a current, thereby, generating an electromagnetic field which, in conjunction with the permanent magnet assembly 10, will rotate the dynamic member 4 which in turn will rotate the mower plate.

FIG. 3 shows a schematic representation of the working assembly in FIG. 2 assembled.

Figure 4:
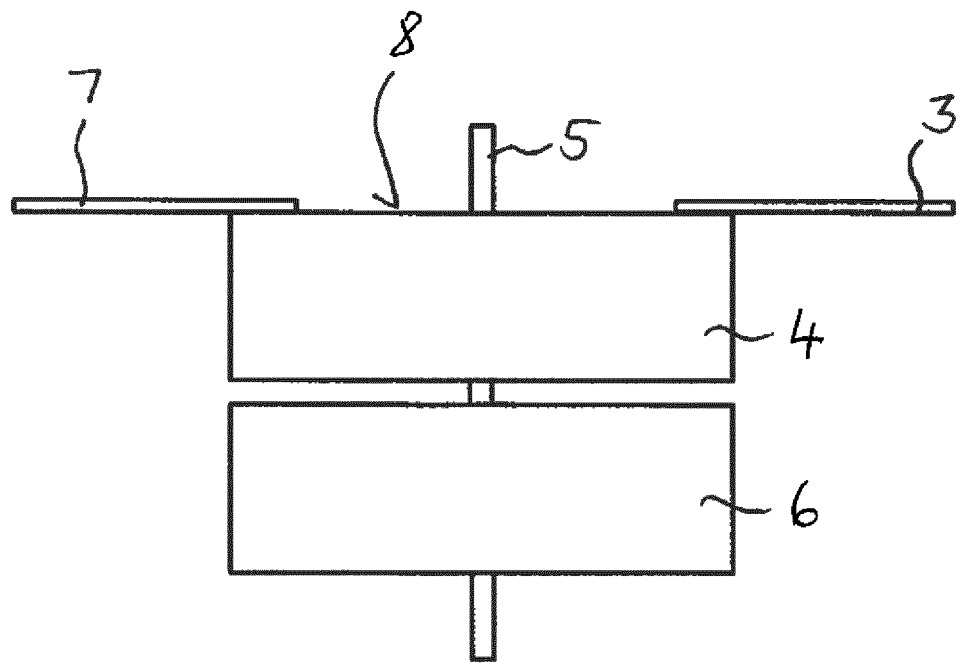

FIG. 4 shows the working assembly from FIG. 1 in a front view. There is a distance between facing surfaces of the static and the dynamic member.

The features disclosed in at least one of the specification, the claims, and the figures may be material for the realization of the disclosure in its various embodiments, taken in isolation or in various combinations thereof.

The invention claimed is:

1. A working assembly suitable for use in an agriculture machine, the assembly comprising:
 a driving system comprising:
  a dynamic member rotatably received on a carrier member and releasably connected thereto;
  a static member received on the carrier member and provided opposite to the dynamic member wherein essentially flat surfaces of the static and dynamic members are provided opposite each other; and
  a combination of driving elements comprising a coil assembly and a permanent magnet assembly, the coil assembly being provided on one of the dynamic member and the static member and being suitable for providing an electromagnetic driving field which, in conjunction with the permanent magnet assembly provided on the static member or the dynamic member, provides a driving force for rotating the dynamic member; and
 a working tool received on the dynamic member and cooperative therewith to be rotatably responsive with the driving system.

2. The working assembly of claim 1, wherein at least one of the static member and the dynamic member is provided as a disk shaped member.

3. The working assembly of claim 2, wherein the driving system is provided as a disk-shaped system.

4. The working assembly according to claim 1, wherein the working tool is releasably connected to the dynamic member.

5. The working assembly according to claim 1, wherein a controller device is connected to the coil assembly.

6. The working assembly according to claim 1, wherein the working tool is suitable for use in at least one of the following agriculture machines: spreader, seeder, and mower.

7. The working assembly according to claim 1, wherein the dynamic member is provided as freely floating member.

8. The working assembly according to claim 1, wherein the dynamic member and static member cooperate to define a permanent magnet electric motor.

9. The working assembly according to claim 1, wherein the working tool comprises at least one radially-extending cutting blade.

10. The working assembly according to claim 1, wherein at least one of the dynamic member and the static member are disposed within a housing.

11. The working assembly according to claim 10, wherein both the dynamic member and the static member are disposed within a housing.

12. The working assembly according to claim 2, wherein the working tool is releasably connected to the dynamic member.

13. The working assembly according to claim 3, wherein the working tool is releasably connected to the dynamic member.

14. An agriculture machine selected from the group consisting of a spreader, seeder and mower, the machine comprising a working assembly with a driving system comprising:
- a dynamic member rotatably received on a carrier member and releasably connected thereto;
- a static member received on the carrier member and provided opposite to the dynamic member, wherein essentially flat surfaces of the static and dynamic members are provided opposite each other; and
- a combination of driving elements comprising a coil assembly and a permanent magnet assembly, the coil assembly being provided on one of the dynamic member and the static member and being suitable for providing an electromagnetic driving field which, in conjunction with the permanent magnet assembly provided on the static member or the dynamic member, provides a driving force for rotating the dynamic member, and
- a working tool received on the dynamic member and cooperative therewith to be rotatably responsive with the driving system.

* * * * *